(12) United States Patent
Blackburn

(10) Patent No.: US 7,334,564 B2
(45) Date of Patent: Feb. 26, 2008

(54) THROTTLE AND INLET VALVES FOR 8 STROKE AND 4 STROKE ENGINES

(76) Inventor: Anthony Edgar Blackburn, 34 Hastings Rd., Southport, Merseyside (GB) PR8 2LW (*) Notice: Subject to any disclaimer, the term of this patent is extended or adjusted under 35 U.S.C. 154(b) by 294 days.

(21) Appl. No.: 10/870,297

(22) Filed: Jun. 18, 2004

(65) Prior Publication Data
US 2005/0109313 A1    May 26, 2005

(30) Foreign Application Priority Data
Oct. 28, 2003    (GB) ................... 0325106.3

(51) Int. Cl.
*F02B 75/02*    (2006.01)
(52) U.S. Cl. ...................... 123/302; 123/432
(58) Field of Classification Search ..............
123/184.21–184.61, 193.5, 302, 432, 21,
123/481, 198 F
See application file for complete search history.

(56) References Cited
U.S. PATENT DOCUMENTS
4,224,912 A * 9/1980 Tanaka .............. 123/568.19
4,779,594 A * 10/1988 Oda et al. ............. 123/432
5,598,819 A * 2/1997 Blackburn .............. 123/302

FOREIGN PATENT DOCUMENTS
DE    2726146 A * 1/1978

* cited by examiner

Primary Examiner—Marguerite McMahon

(57) ABSTRACT

A 'Blackburn Cycle' or 8 stroke and 4 stroke cycle change piston engine has a separate fuel/air inlet duct and valve in a cylinder where the throttle means admits a small volume, namely less than 10% of the cylinder capacity, needed for a low idling speed. A separate 'air only' inlet duct and valve admits alternate 'air only' inductions in each cylinder when less than half load is needed. The preferred plug type of throttle can be disc or cone shaped or shaped to substantially fill the volume between the closed throttle and the inlet valve seat. For higher power the throttle moves away from the inlet valve to open the inlet port. Fuel is injected into the small volume between the throttle and the inlet valve where engine heat helps vaporize the fuel without heating a large mass of the inlet air.

8 Claims, 1 Drawing Sheet

THROTTLE AND INLET VALVES FOR 8 STROKE AND 4 STROKE ENGINES

BACKGROUND

Figure 1:
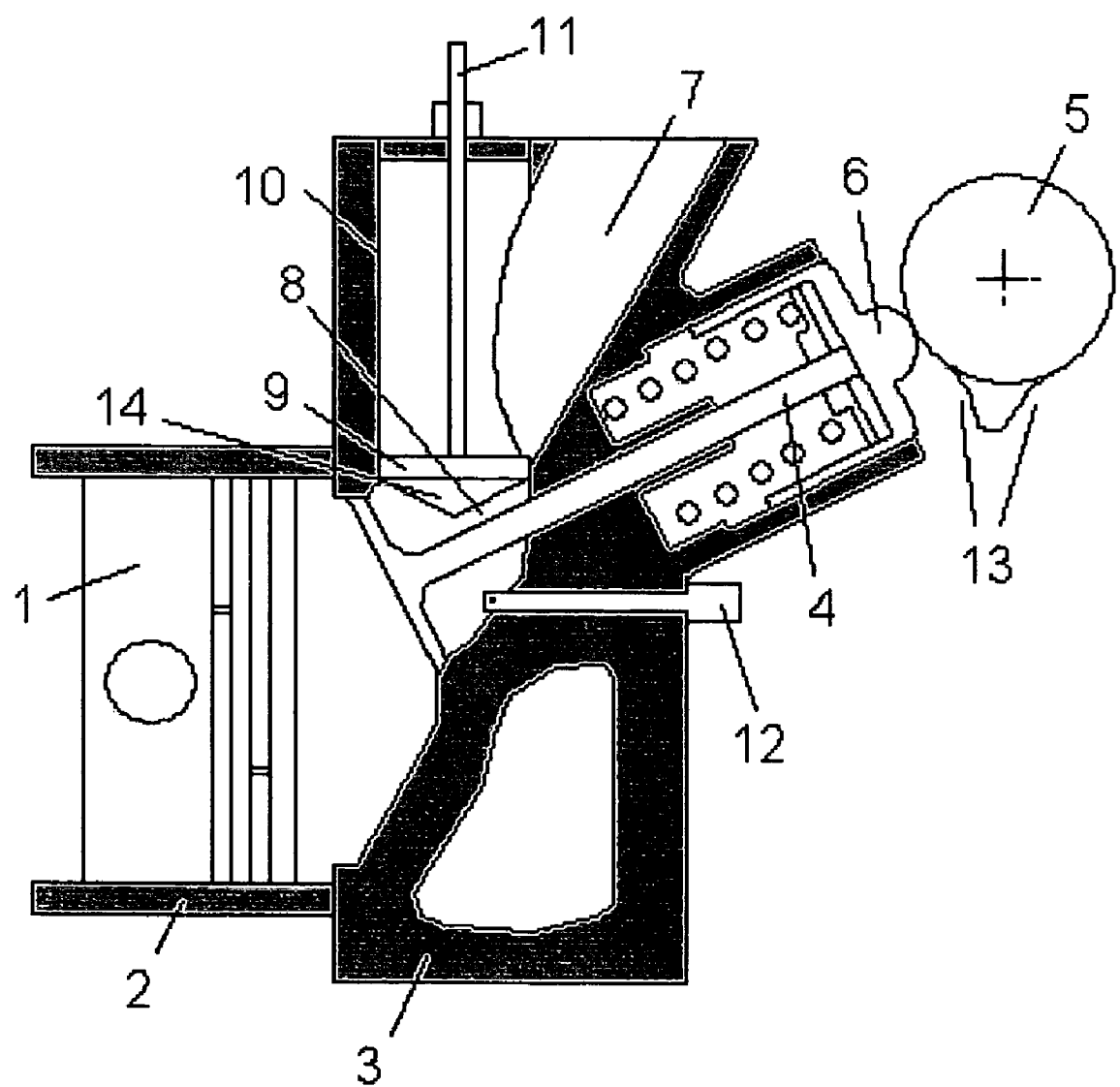

This invention includes features of my previous (U.S. Pat. No. 5,598,819) incorporated by reference and describes a design for gasoline piston engines which aims to increase fuel efficiency and reduce $CO_2$ emissions.

4 stroke gasoline engines are relatively fuel efficient at full load but become much less efficient for lower loads when the throttle is partly closed. A previous concept named 'cylinder de-activation' allows working cylinders to operate with their throttle fully open when less than full load is needed. For example, if one bank of a V8 engine is de-activated and the other bank operates as a usual 4 stroke engine, with their throttles fully open, this delivers half load.

The present invention causes all cylinders to be de-activated for alternate 4 stroke cycles, when less than half load is needed. The de-activated cylinders of the present invention have 'air only' 4 stroke cycles between usual 4 stroke cycles with fuel/air. This enables this engine to deliver half load while the throttles are fully open for the working fuel/air 4 stroke cycles. This is more fuel efficient than half throttling 4 stroke engines or de-activating half the cylinders.

My previous (U.S. Pat. No. 5,598,819) included a camshaft driven at 1:4 crankshaft speed with inlet cams on opposite sides of the camshaft for each cylinder. The fuel/air inlet valve, for one cylinder, opens for a 4 stroke cycle, while the 'air only' inlet valve remains closed. For the next 4 stroke cycle, the 'air only' inlet valve opens while the fuel/air inlet valve remains closed. This alternate opening inlet valve sequence continues unchanged even when the mode changes from 8 stroke to 4 stroke. A gate valve kept both fuel/air and 'air only' inlet ports separate for alternate 'air only' cycles and 8 stroke mode. To change to 4 stroke mode for higher power the gate valve, in the 'air only' inlet, moves to seal the 'air only' inlet and opens a port to the fuel/air inlet to allow fuel/air to enter the cylinder through both inlet valves. The two adjacent 4 stroke cycles are different and become an 8 stroke or Blackburn Cycle for half load or less. The strokes for this cycle are as follows:—1 fuel/air induction, 2 compression, 3 power, 4 exhaust, 5 'air only' induction, 6 'air only' compression, 7 'air only' expansion, 8 'air only' exhaust. If half the maximum 4 stroke load is needed, it follows that power stroke 3 delivers full power and strokes 5-8 deliver no power.

After my previous (U.S. Pat. No. 5,598,819) was filed, tests revealed a disadvantage. The clearance volume in the cylinder head is about 10% of the cylinder capacity and this volume cannot be pushed out of the cylinder by the piston. There is a residue of 'air only', after stroke 8, already in the cylinder, which is then mixed with the fresh fuel/air intake during stroke 1 above. If the volume in the inlet pipe between the throttle and the inlet valve seat is also 10% of the cylinder capacity then, even if the throttle is nearly closed, the cylinder is nearly 20% full for the next combustion. This gave too much power and caused a high idling speed.

The present invention replaces the usual throttle valve, located upstream from the inlet valve, with a throttle which is close to the inlet valve when the throttle is nearly closed for idling. A lower power and idling speed can then be achieved reducing the fuel needed. When more than half load is needed from the Blackburn Cycle, fuel is injected for stroke 5 when the 8 stroke cycle becomes two 4 stroke cycles. Other practical design features which were found to be needed during tests are also included in this patent application.

DESCRIPTION

The present invention describes a piston engine with a separate 'air only' inlet duct, without a throttle, and an inlet valve in a cylinder providing alternate 'air only' 4 stroke cycles between 4 stroke cycles with fuel/air inductions through a separate fuel/air inlet duct and inlet valve, when less than half load is needed from an internal combustion engine, where the throttling means in the fuel/air inlet admits less than 10% of the cylinder capacity for an induction stroke, needed for a low idling speed. The preferred throttle is plug or disc shaped or cylindrical or any other shape which can slide in a housing or bore to close the inlet port when less engine power is needed. When more power is needed the throttle is moved away from the inlet valve, opening more of the inlet port to allow more fuel/air to enter the engine during an induction stroke. The inlet port is fully open when the throttle is moved fully away from the inlet valve providing an unobstructed inlet duct. There is preferably one such throttle per cylinder on 1, 3 or 5 cylinder or other engines with an odd number of cylinders.

The plug type of throttle is disc or cone shaped towards the inlet valve. It moves within the inlet port or within a bore which is adjacent to the inlet port so that the plug opens and closes the inlet port itself. The seat of this throttle is as close as possible to the seat of the fuel/air inlet valve. A control is a rod attached to the plug throttle and leads out of the inlet port area via a seal. The control rod is attached directly or indirectly to the accelerator pedal. Alternatively an electric servo operates the plug throttle outside or inside the inlet port area. The control is mechanical, electrical or other means influenced by the accelerator pedal position, a microprocessor, computer, driver preferences, oil, air or water temperature and atmospheric conditions.

The surface of the plug throttle itself is shown in FIG. 1/1 as cone shaped downstream from the sealing surface of the throttle. The volume between the throttle seat and the inlet valve seat is less than 10% of the cylinder capacity. In some circumstances it is advantageous to further reduce the volume between inlet and throttle valves. Then the downstream surface of the plug throttle is shaped to substantially fill the space around the inlet valve stem. Clearance allows the throttle to open or close as needed. In this case the volume between the throttle and inlet valve seat is less than 5% of the cylinder capacity.

When the throttle is slightly open for low power and the inlet valve is closed, the very small volume between the throttle and inlet valve seats fills quickly. The pressure in this space is then close to atmospheric when the inlet valve opens for the next induction. Little if any of the cylinder contents is then sucked back into the inlet when the inlet valve opens. This contrasts with the hot exhaust gas, which is sucked into the larger volume between the inlet valve seat and throttle seat of a conventional engine, by the vacuum which remains relatively constant for low power as the inlet valve opens. The fresh fuel/air charge in the present invention is cooler and contains less exhaust gas providing a better explosive charge.

The preferred location for the fuel injector is between the throttle and inlet valve seats when the heat from the cylinder head vaporises the fuel without causing a large temperature rise for the bulk of the inlet air which would reduce the fuel efficiency of the engine. Inlet air turbulence in the space between the throttle and inlet valve seats helps mix the fuel and air, prior to the mixture being drawn into the engine cylinder. Better fuel/air mixing gives more complete and faster combustion.

The inlet valves are operated by cams either directly or via a rocker or link. The cam follower is convex or radiused at the point of contact with the cam, and the cam form is concave at the point where the inlet valve starts to open and where it ends closing. The cams open and close the inlet valves with approximately 60 degrees of cam rotation. The inlet cam lobes are on opposite sides of the camshaft for each cylinder and the camshaft is driven at 1:4 crankshaft speed.

Each cylinder has a separate fuel/air inlet duct and inlet valve with a throttle close to this inlet valve. The second separate 'air only' inlet duct and valve has no throttle but has provision to switch its separate fuel injector on or off for an induction as needed for an increased or reduced power output. Opening or closing the throttle in the fuel/air inlet also controls the power output with or without fuel injection in the 'air only' inlet.

The plug type throttle is mainly intended for 8 Stroke and 4 stroke cycle change engines or 'Blackburn Cycle' engines, but may also be applied to 4 stroke or 2 stroke engines. One or more fuel/air and 'air only' inlet valves and at least one exhaust valve and other usual components are fitted in each cylinder (not shown).

Alternative fuel injector locations are upstream of the throttle or directly in the combustion chamber. Other throttle designs which admit a small volume of fuel/air mixture are suitable for 'Blackburn Cycle' engines.

DETAILED DESCRIPTION

A preferred embodiment of the invention will now be described with reference to FIG. 1/1.

Piston 1 operates in cylinder 2 which is closed by cylinder head 3. Inlet valve 4 is operated by cam 5 via cam follower 6. Inlet port 7 leads on to a small chamber 8 which is nearly sealed by throttle 9 at idling speed. Throttle 9 can move in bore 10 away from inlet valve 4 to open the throttle and inlet port 7 to allow more air to enter the engine during an induction stroke. Attached to throttle 9 is control rod 11 which is connected directly or indirectly to the accelerator pedal (not shown). Fuel injector 12 injects fuel into the space between the throttle and inlet valve seat. Cam follower 6 has a convex form while cam 5 has a concave shape 13 to start opening and finish closing inlet valve 4. A cone shaped end 14 is shown on throttle 9 to reduce the volume in chamber 8. Similarly the inner end of throttle 9 can be shaped to substantially fill chamber 8 for idling speeds but maintaining clearance to allow easy opening and closing of the throttle (not shown).

The invention claimed is:

1. An internal combustion engine comprising:
    at least one cylinder having a piston mounted therein for reciprocating strokes of the piston in the cylinder, the reciprocating strokes including induction strokes of the piston in the cylinder where at least air is drawn into the cylinder;
    a first intake channel communicating with the cylinder;
    a second intake channel communicating with the cylinder;
    an exhaust channel communicating with the cylinder;
    a first intake valve in the first intake channel controlling communication between the first intake channel and the cylinder;
    a second intake valve in the second intake channel controlling communication between the second intake channel and the cylinder;
    means for supplying fuel to at least the first intake channel; and
    means for controlling opening of at least one of the first and second intake valves on each induction stroke of the piston in the cylinder to cause an air and fuel mixture to be drawn into the cylinder when only the first intake valve is opened on an induction stroke and to cause only air to be drawn into the cylinder when only the second intake valve is opened on an induction stroke, such that an air only 4 stroke cycle alternates with a fuel/air 4 stroke cycle, and wherein throttling means in the fuel/air inlet admits less than 10% of the cylinder capacity for an induction stroke, as needed for a low idling speed.

2. A claim as claimed in claim 1 where the throttle is disc or cone shaped towards the inlet valve and moves towards and away from the inlet valve, within the inlet port or within a bore adjacent to the inlet port so that the throttle can close or open the inlet port itself for higher power.

3. A claim as claimed in claim 1 where the downstream throttle surface is shaped to substantially fill the volume between the inlet valve seat and the throttle seat to reduce this volume to less than 5% of the cylinder capacity when the throttle is in the nearly closed position for idling and moves away from the inlet valve within the inlet port or in a bore adjacent to the inlet port to open this inlet fully for higher power.

4. A claim as claimed in claim 1 where the inlet cam followers are convex at the surface where it contacts the cam and where the inlet cam form is concave at the point where the inlet valve starts to open or ends closing.

5. A claim as claimed in claim 1 where the inlet cam open period corresponds with approximately 60 degrees of camshaft rotation.

6. A claim as claimed in claim 1 where a fuel injector is located in the small volume between the throttle and the inlet valve seat, so that the heat from the engine helps vaporise fuel without heating a large mass of intake air.

7. A claim as claimed in claim 1 where the throttle is moved directly by the accelerator pedal or indirectly via a servo and microprocessor or computer influenced by oil, water and air temperature or pressure and driver preferences.

8. A claim as claimed in claim 1 where the engine has 1, 3, 5 or any other odd number of cylinders for smooth running in both 4 stroke and 8 stroke modes.

\* \* \* \* \*